United States Patent [19]

Walter

[11] Patent Number: 4,830,048
[45] Date of Patent: May 16, 1989

[54] ROTARY SWITCH AND VALVE ASSEMBLY
[75] Inventor: John Walter, Evergreen Park, Ill.
[73] Assignee: Continental Can Company, Inc., Norwalk, Conn.
[21] Appl. No.: 207,500
[22] Filed: Jun. 16, 1988
[51] Int. Cl.$^4$ .................... F16L 27/08; H01H 9/06
[52] U.S. Cl. ..................... 137/560; 137/580; 137/625.11; 137/625.21; 200/24; 200/61.86
[58] Field of Search .............. 137/560, 580, 625.11, 137/625.15, 625.21; 200/23, 24, 26, 61.86

[56] References Cited

U.S. PATENT DOCUMENTS

| | | | |
|---|---|---|---|
| 2,424,650 | 7/1947 | Dickerman | 137/560 X |
| 2,563,531 | 8/1951 | Kirkman et al. | 137/580 X |
| 2,984,715 | 5/1961 | Brinster et al. | 200/24 X |
| 3,140,366 | 7/1964 | Elliott | 200/24 |
| 3,265,087 | 8/1966 | Livingston | 137/560 |
| 3,381,704 | 5/1968 | Richardson | 137/580 X |
| 3,517,694 | 6/1970 | Lieffring | 137/560 |
| 3,851,663 | 12/1974 | Neuko | 137/580 |
| 3,910,309 | 10/1975 | Kaiser | 137/580 |
| 4,509,555 | 4/1985 | Stirbis | 137/625.11 |
| 4,700,745 | 10/1987 | Ellis | 137/625.11 |

Primary Examiner—John Rivell
Attorney, Agent, or Firm—Charles E. Brown; Paul Shapiro; Charles A. Brown

[57] ABSTRACT

This relates to a rotary switch and rotary valve assembly for a multiple work station machine wherein the work stations rotate and are sequentially presented to an operating position. There may be a high voltage and two low voltage switches with the switches being so constructed wherein electrical connections are made with each work station in timed relation to its presentation to the work position and for the required period of time. Further, the rotary valve assembly functions in sequence to present operating fluids to each work station in the order of presentation of such work station to its operating position and in timed sequence to the operation performed thereby.

5 Claims, 3 Drawing Sheets

ROTARY SWITCH AND VALVE ASSEMBLY

This invention relates in general to new and useful improvements in rotary switches and rotary valves and most particularly to rotary switches and rotary valves for use in conjunction with a multiple work station machine wherein electrical connections and fluid connections must be made with each work station of such a machine sequentially in timed relation.

This invention most particularly relates to a rotary machine having a plurality of work stations carried by a rotating support plate, which in turn, is carried by a main shaft of such a machine. Each work station requires several electrical connections including a high voltage electrical connection wherein the electrical connection is to be made for a short period of time only and in timed relation to the position of the work station at an operating position. Accordingly, there is mounted on the rotating shaft two separate rotating contact arrangements, one of the contact arrangements being a continuous slip ring and the other being in the form of an individual limited circumferential extent contact for each of the work stations. There is a fixedly mounted brush assembly for each of the contact arrangements.

Advantageously, the contact arrangements are mounted at the upper end of the rotating shaft for ease of replacement.

There may also be provided a second rotary switch arrangement of a similar construction but particularly designed for receiving low voltage. If desired, there may be two of such low voltage rotary switches.

Further, there is carried by the rotating shaft in association with the rotary switches a rotary valve for directing several fluids to each of the work stations. Such rotary valve preferably includes a rotating manifold plate having a plurality of fluid connections for each of the work stations.

The rotary valve further includes a fixed supply manifold which has associated therewith a fixed seal with the seal having formed in a face thereof which opposes the manifold plate a plurality of grooves, there being one groove for each separate fluid supply and the grooves being in communication with ports in the manifold plate from each of the sets of passages for the individual work stations.

It is preferred that the inlet manifold and the associated seal be fixedly mounted relative to the rotating shaft and utilizing the same support as that provided for supporting the brush assembly for the rotary switch.

With the above and other objects in view that will hereinafter appear, the nature of the invention will be more clearly understood by reference to the following detailed description, the appended claims and the several views illustrated in the accompanying drawings.

Figure 1:
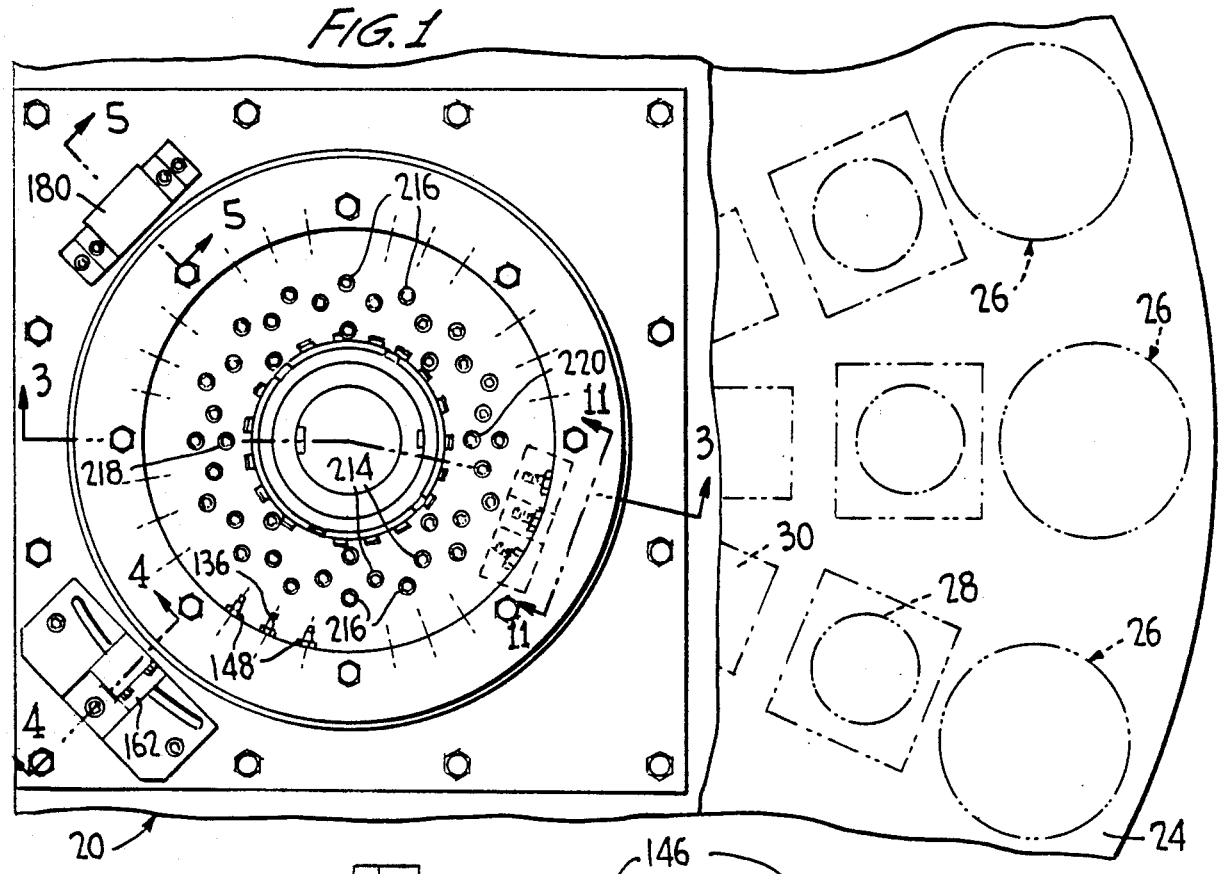
FIG. 1 is a top plan view of the rotary switch and valve assembly and shows associated therewith in phantom lines a support plate carrying a plurality of individual work stations.
Figure 2:
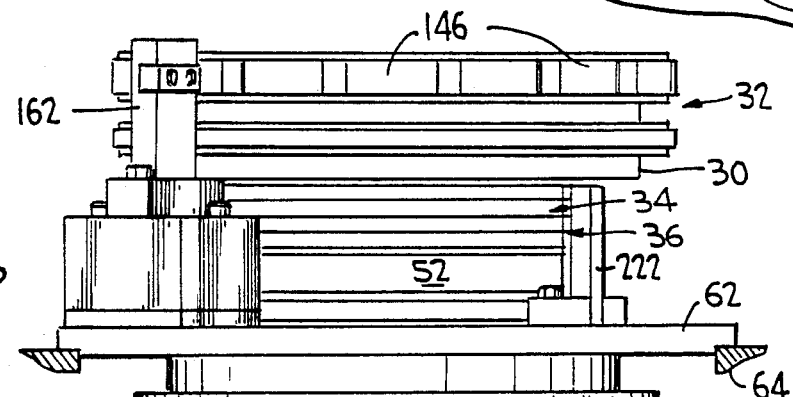
FIG. 2 is a side elevational view of the rotary switch and valve assembly and shows further the details thereof.

Referring now to the drawings in detail, it will be seen that there is illustrated in FIGS. 1 and 2 portions of a multiple station rotary machine, the machine being generally identified by the numeral 20. Only general details of the machine, exclusive of the specific details of the rotary switch and rotary valve assembly are illustrated. Most particularly, the machine 20 includes a vertical main shaft 22 which rotates continuously. A lower portion of this main shaft 22 carries a support 24 which is only partially and schematically illustrated in FIGS. 1 and 2. The support plate 24 carries a plurality of work stations 26 which are only schematically illustrated and which in the actual machine ae 16 in number although the number of work stations may, of course, vary. Although it is not illustrated, it is to be understood that each work station includes a sealing head which includes an induction heating coil, low voltage control means and various fluid supplies. Further, each sealing head is carried by a vertically movable support including an extensible fluid motor in the form of a double acting cylinder. The fluid and electrical lines to each sealing head is supplied through a supply unit generally identified by the numeral 28. Further, there will be associated with each work station 26 a valve unit 30 which in of itself forms no part of this invention. The above described components of the machine 20 are the subject of separate co-pending applications.

Figure 3:
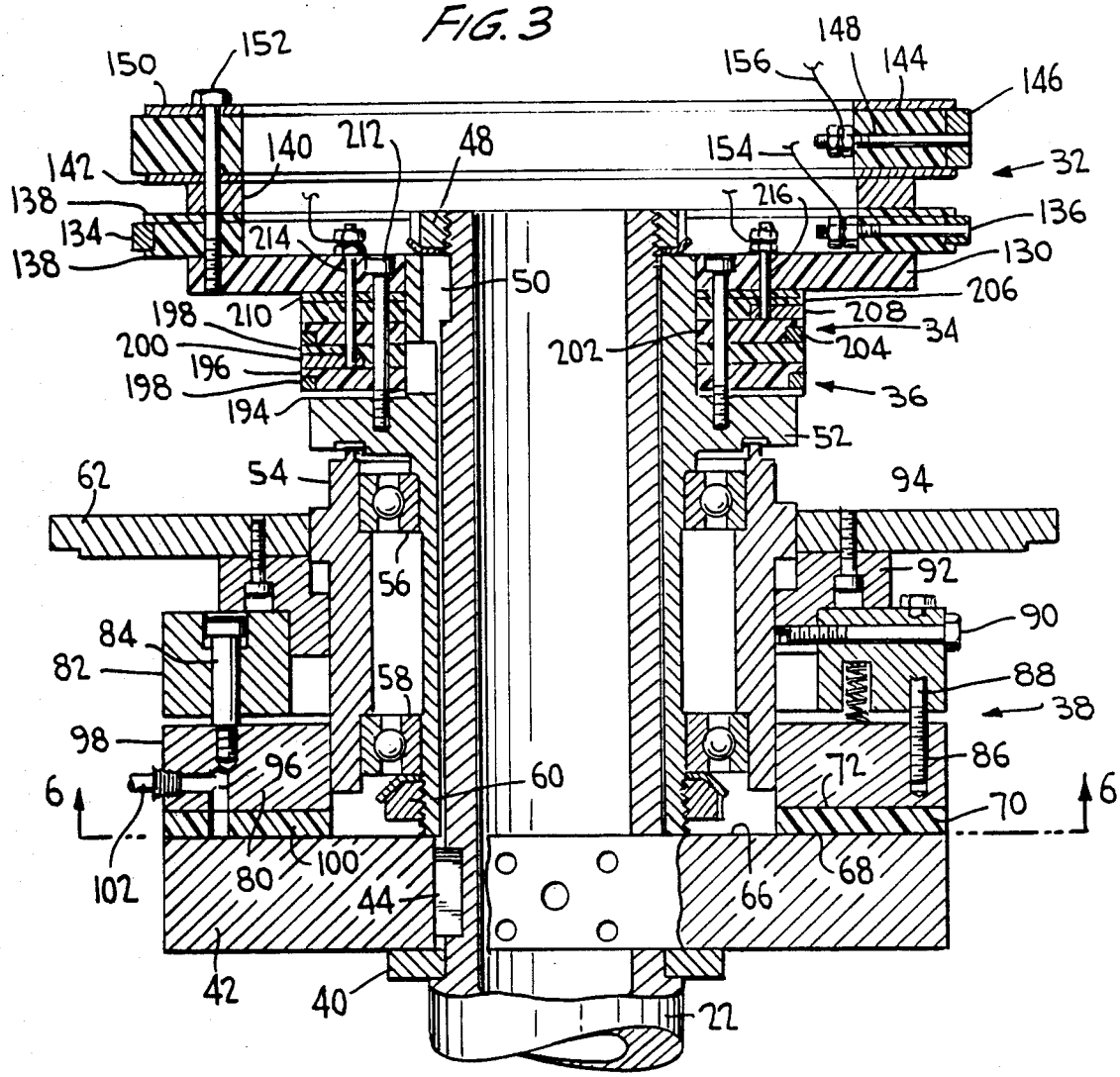
FIG. 3 is an enlarged fragmentary sectional view taken generally along the line 3—3 of FIG. 1 and shows most specifically the details of the rotary switch and valve assembly.
Figure 4:
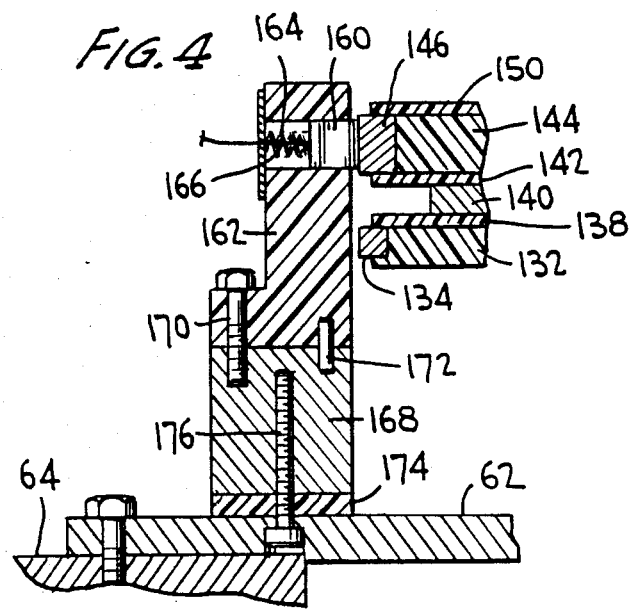
FIG. 4 is a fragmentary vertical sectional view taken generally along the line 4—4 of FIG. 1 and shows the details of an upper brush assembly.

Referring now to FIG. 3, it will be seen that in accordance with this invention there is provided an upper most high voltage rotary switch generally identified by the numeral 32. Beneath the rotary switch 32 there are low voltage rotary switches 34 and 36. Finally, beneath all of the rotary switches, there is the rotary valve which is the subject of this invention, the rotary valve being generally identified by the numeral 38.

The structural details of a support arrangement for the rotary switches and the rotary valve will now be described. Adjacent the bottom of FIG. 3, it will be seen that the shaft 22 carries an annular mounting flange or support 40 on which there is seated manifold palte 42 which will be described in detail hereinafter. The manifold plate 42 is connected to the shaft 22 by way of a key 44 for rotation of the manifold plate 42 with the shaft 22.

An inner sleeve 46 is telescoped over the upper part of the shaft 22 and has a lower end resting on the manifold plate 42. The upper end of the inner sleeve 46 is engaged by a nut and lock washer assembly 48 carried by the upper end of the shaft 22 anf forcing the inner sleeve 46 down against the manifold plate 42. A key 50 interlocks the inner sleeve 46 with the shaft 22 for rotation with the shaft 22.

An upper portion of the inner sleeve 46 is provided with a mounting flange 52 the function of which will be described in detail hereinafter.

An outer sleeve 54 is rotatably journalled relative to the inner sleeve 46 by a pair of bearings 56, 58. A nut and lock washer assembly 60 carried by the lower end of the inner sleeve 46 bears against the bearing 58 and serves to axially portion the outer sleeve 54 relative to the inner sleeve 46 and the shaft 22.

The upper portion of the outer sleeve 54 carries a support plate or support member 62 which, as is best shown in FIG. 2, is, in turn, connected to a fixed portion 64 of the machine so as to prevent rotation of the support member 62 and the outer sleeve 54 with the shaft 22.

The details of the support arrangement having been described, specific description of the rotary valve 38 will be made here.

As previously stated, the rotary valve 38 includes a lower manifold plate 42. The manifold plate 42 has a smooth flat upper surface 66 which is engaged in sliding contact by a lower face 68 of an annular seal 70 which is formed of a suitable seal forming plastic such as nylon.

The seal 70 has an upper face 72 which is bonded to the underside of an inlet manifold 80. The inlet manifold 80, in turn, is carried by a mounting rig 82 for limited axial movement. The inlet manifold 80 is connected to the mounting ring 82 by a plurality of circumferentially spaced shoulder bolts 84 which mounts the inlet manifold 80 on the mounting ring 82 in spaced relative thereto and for limited axial movement. Further, rotational orientation of the inlet manifold 80 with respect to the mounting ring 82 is provided by one or more studs 86 threaded into the inlet manifold 80 and projecting upwardly therefrom into an associated bore 88 in the underside of the mounting ring 82.

It will be apparent that the mounting ring 82, the inlet manifold 80 and the seal 70 form a replaceable unit. As a result, each of these three components is of a split construction. The assembly is maintained in position by a plurality of circumferentially spaced, radially extending bolts 90 which extend to the upper portion of the mounting ring 82 into a lower portion of a spacer ring 92. The spacer ring 92, in turn, is bolted to the underside of the support member 62 by a plurality of circumferentially spaced bolts 94. Thus the inlet manifold 80 and the seal 70 are fixed against rotation while the manifold plate 42 is mounted on the shaft 22 for rotation with respect thereto.

In accordance with the specific machine for which the rotary valve 38 is intended, there will be connected to the inlet manifold 80 a fluid cylinder retraction air line, a fluid cylinder extension air lines, a vacuum cup line, a pressure line for the vacuum cup, a tray vacuum line, a vent, and a nitrogen line. For each of these lines there will be formed in the inlet manifold an L-shaped port arrangement 96 which is schematically shown in FIG. 3 and which opens through a cylindrical surface 98 of the inlet manifold 80 and a lower face 100 thereof. A suitable fitting 102 will be threaded into the port 96 through the cylindrical face 98.

Figure 6:
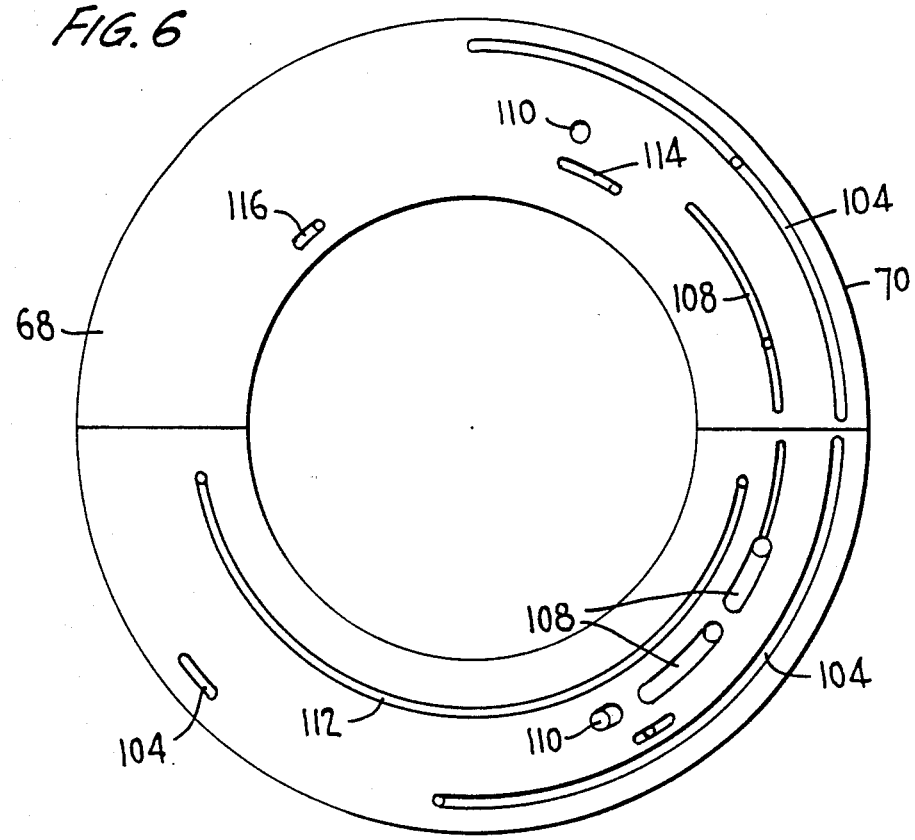
FIG. 6 is a bottom plan view of a seal taken generally along the line 6—6 of FIG. 3 and shows the details of fluid distributing grooves formed therein.
Figure 8:
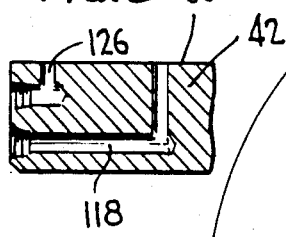
FIG. 8 is a fragmentary vertical sectional view taken generally along the line 8—8 of FIG. 7 and shows one of three port arrangements for each of the work stations.
Figure 7:
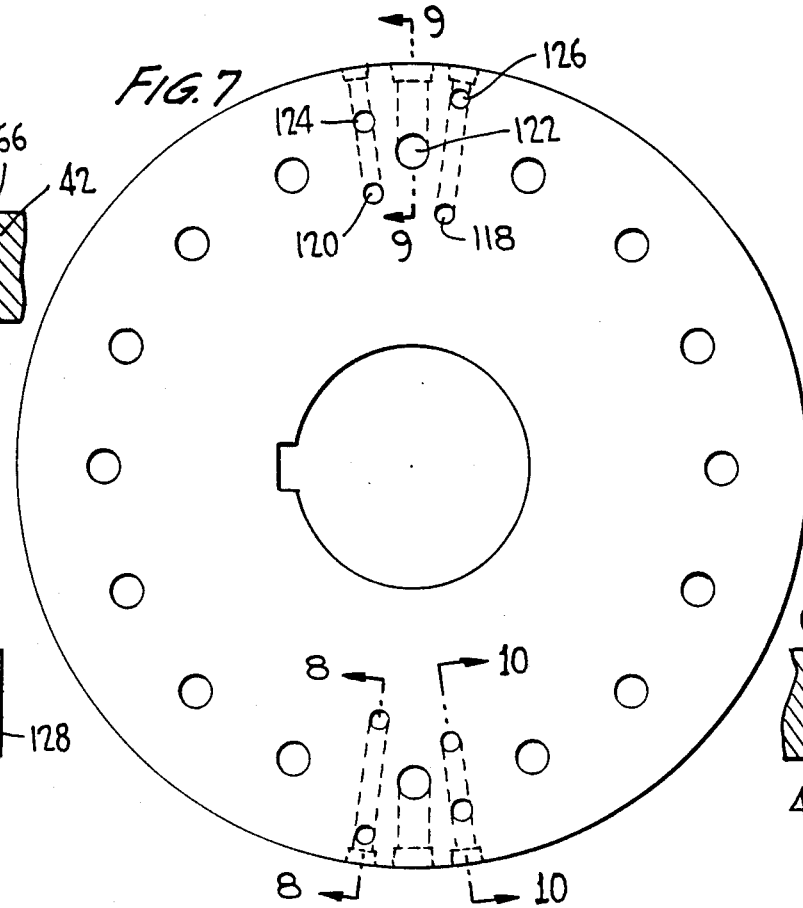
FIG. 7 is a top plan view of the manifold plate and shows the arrangement of fluid ports formed therein for the individual work stations.
Figure 9:
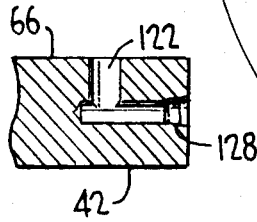
FIG. 9 is a fragmentary vertical sectional view taken generally along the line 9—9 of FIG. 7 and shows the details of yet another of the port arrangements for each work station.
Figure 10:
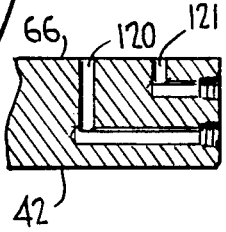
FIG. 10 is a fragmentary vertical sectional view taken generally along the line 10—10 of FIG. 7 and shows the details of a further of the port arrangements for each work station.

At this time it is pointed out that the various ports of which the port 96 is typical, will open through the face 100 at different radial spacings from the axis of the shaft 22. It is also to be noted that aligned with each port opening in the face 100 will be a port opening in the face 72 of the seal 70. Further, each such opening in the seal 70 will open into a groove in the face 68 of the seal 70. The general groove arrangement is shown in FIG. 6. The groove arrangement in the face 68 of the seal 70 includes an outer most series of grooves 104 for the cylinder retraction air. Radially inwardly of the grooves 104 is a groove 106 for the nitrogen supply. Next radially inwardly is a series of groove 108 for the tray vacuum with there being on the same radius a pair of vents 110.

Radially inwardly of the grooves 108, 110 there is a groove 112 for the vacuum cup. At the same radius there is a groove 114 for pressure to the vacuum cup. Finally, at an inner most radius, there is a groove 116 for supplying cylinder extension air to each fluid cylinder. It will thus be seen that there are fluid grooves at five different radix in the face 68 of the seal 70.

In order that different fluids may be supplied sequentially to the work stations 26 in timed relation, the manifold plate 42 has opening through the face 6 thereof five ports 118, 120, 122, 124 and 126 as is best shown in FIGS. 7 through 10. Each of these ports open through a cylindrical face 128 of the manifold plate 42 in a threaded opening portion into which a suitable fitting may be threaded. Fluid lines connected to the cylinderical face of the manifold plate 42 are connected to respective ones of the valve units 30 which include electrically controlled valves (not shown) which are not part of this invention.

Referring now the rotary switch 32, it will be seen in FIG. 3 that there is mounted at the upper end of the inner sleeve 46 a mounting plate 130 which is formed of a suitable insulating material. A slip ring holder 132, which is annular in construction and also formed of an insulating material, is seated on the support plate 130. An electrically conductive slip ring 134 is seated in the outer periphery of the slip ring holder 132 and is held in place by a plurality of circumferentially spaced stud member 136 which form connecting members.

A thin annular plate 138 overlies the slip ring holder 132 and seated thereon is a spacer 140. Another thin ring 142 formed of insulating material is seated on the spacer 140 and has seated thereon a contact holder 144. The contact holder is also formed of an insulating material and has formed in the outer periphery thereof a plurality of circumferential notches in which circumferentially extending contacts 146 are seated. The contacts 146 have outer cylindrical surfaces which lie in a common cylinderical outline. Each contact 146 has extending radially inwardly therefrom a stud 148 which serves not only to hold the contact in place, but also functions as an electrical connecting member.

Finally, there overlies the holder 144 a thin ring 150 which is formed of insulating material and is similar to the rings 138, 142. The entire set of rings, spacer and holders are clamped to the upper surface of the mounting member 130 by a plurality of circumferentially spaced bolts 152.

At this time it is pointed out that there is one contact 146 for each of the work stations 26 and that there is one connecting member 148 for each of the contacts 146. Thus when there are 16 work stations 26, there will be 16 of the connecting members 148. Also, from FIG. 1, it will be seen that between each pair of connecting members 148, there is one of the connecting members 136 with the result that there are 8 connecting members 136. A high voltage lead extends from each of the connecting members to a respective sealing head with the leads being identified by the numerals 154 and 156.

In order that electrical energy may be supplied to the contacts 146, there is provided a spring loaded brush 160 which is mounted in a brush holder 162 and resiliently urged radially inwardly by a spring 164. The brush 160 is connected to a contact plate 166 to which a lead (not shown) is connected.

The brush holder 162 is mounted on a supporting base 168 by way of bolts 170 and aligning pins 172. The base 168 is seated on an insulating spacer 174 which, in turn, is seated on the mounting plate 62. The base 168 is secured to the plate 62 by means of suitable fasteners 176 which are formed of an insulating material such as nylon.

Figure 5:
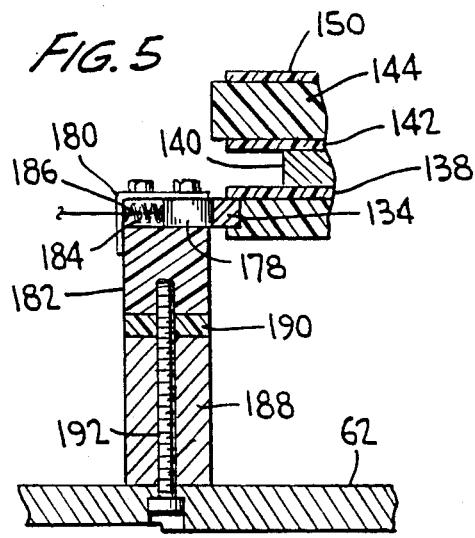
FIG. 5 is a fragmentary vertical sectional view taken generally along the line 5—5 of FIG. 1 and shows the details of a lower brush assembly.

With reference to FIG. 5, it will be seen that electrical energy is supplied to the slip ring 134 by way of a brush 178 which is suitable mounted in a brush holder 180 which, in turn, is mounted on a support 182. The brush 178 is urged radially inwardly by way of a spring 184 and is connected to a contact plate 186 to which a power lead is connected.

The mounting member 182 is mounted on a base 188 by way of an intermediate insulating spacer 190, and the base 188 in turn seats on the plate 62. Bolts 192 extend from the plate 62 through the base 188 and the spacer 190 ad are threaded into the mounting member 182. The bolts 192 are formed of an insulating material such as nylon.

Referring once again to FIG. 3, it will be seen that the lower low voltage switch 36 is seated on the mounting flange 52 and the upper low voltage switch 34 is seated on the low voltage switch 36. The two low voltage switches 34, 35 are substantially of an identical construction.

The switch 36 includes a lower annular spacer 194 on which there is seated a slip ring holder 196 which has mounted in the periphery thereof a slip ring 198. A contact holder 198 is seated on the slip ring holder 196 and has mounted in the outer periphery thereof a plurality of circumferentially spaced contacts 200 which correspond generally to the contacts 146 and will be of the same number.

The rotary switch 34 includes a slip ring holder 202 which is seated on the contact holder 200 and which carries s slip ring 204. A contact holder 206 is seated on the slip ring holder 202 and carries a plurality of circumferentially spaced contacts 208 which correspond to the contacts 200 and will be of the same number.

An insulated annular spacer 210 is positioned between the contact holder 106 and the underside of the insulated mounting plate 130. A plurality of bolts 212 extend down through the insulating plate 130, the spacer 206, the contact holders 198, 206, the slip ring holders 196, 202 and the spacer 194 and are threaded into the annular mounting flange 52. Thus in effect, the plate 130 clamps together the components of the rotary switches 34, 36.

At this time it is pointed out that with the exception of the slip rings and contacts, all the components of the rotary switches 34, 36 are formed of an insulating material.

Each of the contacts 200 carries a stud 214 which extends up through the plate 130 and forms a connecting member. In a like manner, each of the contacts 208 carries a stud 216 which extends up through the plate 130. Suitable leads will be connected to the upper ends of the contacts 214, 216 and extend to respective ones of the work stations.

It will be seen in FIG. 1 that the connecting members 214, 216 are arranged in two circular patterns. Further, there will be a connecting member 218 in the form of a stud which extends upwardly from the slip ring 190 while a similar connecting member 220 will extend up from the slip ring 204. Common leads will extend from the connecting members 218, 220 to the respective work stations.

Figure 11:
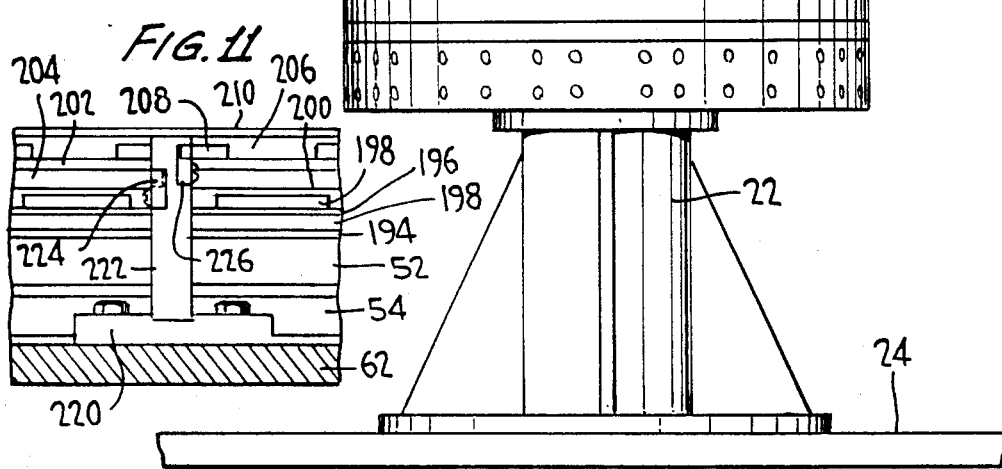
FIG. 11 is a fragmentary vertical sectional view taken generally along the line 11—11 of FIG. 1 and shows the details of a brush mounting arrangement for a low voltage rotary switch assembly.

Referring now to FIG. 11, it will be seen that there is carried by the plate 62 a base 220 which carries a support 222 which, in turn, carries brush holders 224 and 226 for the slip ring 204 and the contacts 108, respectively of the rotary switch 34. If desired, similar brush holders may be mounted on the support 22 for the rotary switch 36.

It will be readily apparent from the foregoing that as the shaft 22 rotates to sequentially position the work stations 26 at a preselected operating position, the rotary switches and the rotary valve will serve to supply the required electrical connections and fluid connections to the respective work stations in timed relation to the position of such work station 26 to the operating position.

Although only a preferred embodiment of the rotary switch and rotary valve assembly has been specifically illustrated and described herein, is to be understood that minor variations may be made therein without departing from the spirit and scope of the invention as defined by the appended claims.

I claim:

1. A combined switch and valve assembly for a machine having a plurality of work stations, said machine including a rotating shaft carrying said work stations for rotation with said shaft, said valve assembly including a manifold plate seated on a shoulder member of said shaft and secured to said shaft for rotation with said shaft, an inner sleeve telescoped over said shaft and keyed to said shaft for rotation with said shaft, said inner sleeve being seated on said manifold plate in clamping relation, said inner sleeve including a mounting flange, said switch assembly being mounted on said mounting flange, an outer sleeve mounted on said inner sleeve for relative rotation, a fixed support carried by said outer sleeve, said valve assembly including a supply manifold and a seal carried by said support for axial movement with said seal clamped between said supply manifold and said manifold plate.

2. A combined switch and valve assembly according to claim 1 wherein said switch assembly includes brush means mounted on said support.

3. A combined switch and valve assembly according to claim 1 wherein said switch assembly includes a high voltage rotary switch mounted on one face of said mounting flange and a low voltage rotary switch mounted on an opposite face of said mounting flange.

4. A combined switch and valve assembly according to claim 1 wherein said switch assembly includes means for supplying electrical connections with each of said work stations in timed sequential relation.

5. A combined switch and valve assembly according to claim 1 wherein said valve assembly includes means for supplying plural fluids in sequence and in timed relation to each of said work stations.

* * * * *